Aug. 3, 1937.    R. H. LAWSON ET AL    2,089,147
MACHINE FOR TRANSFERRING FABRIC
Filed Aug. 28, 1935    6 Sheets-Sheet 3

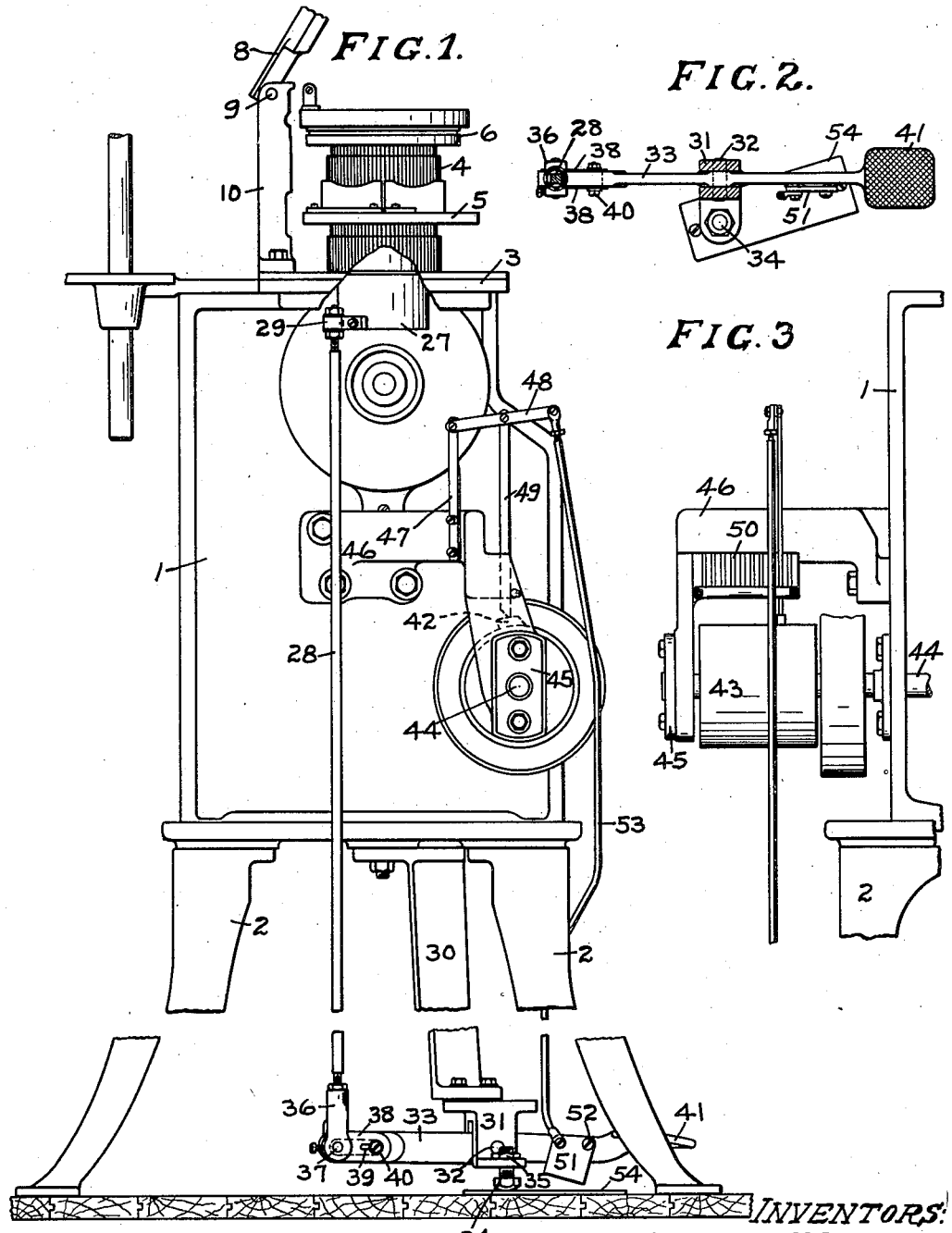

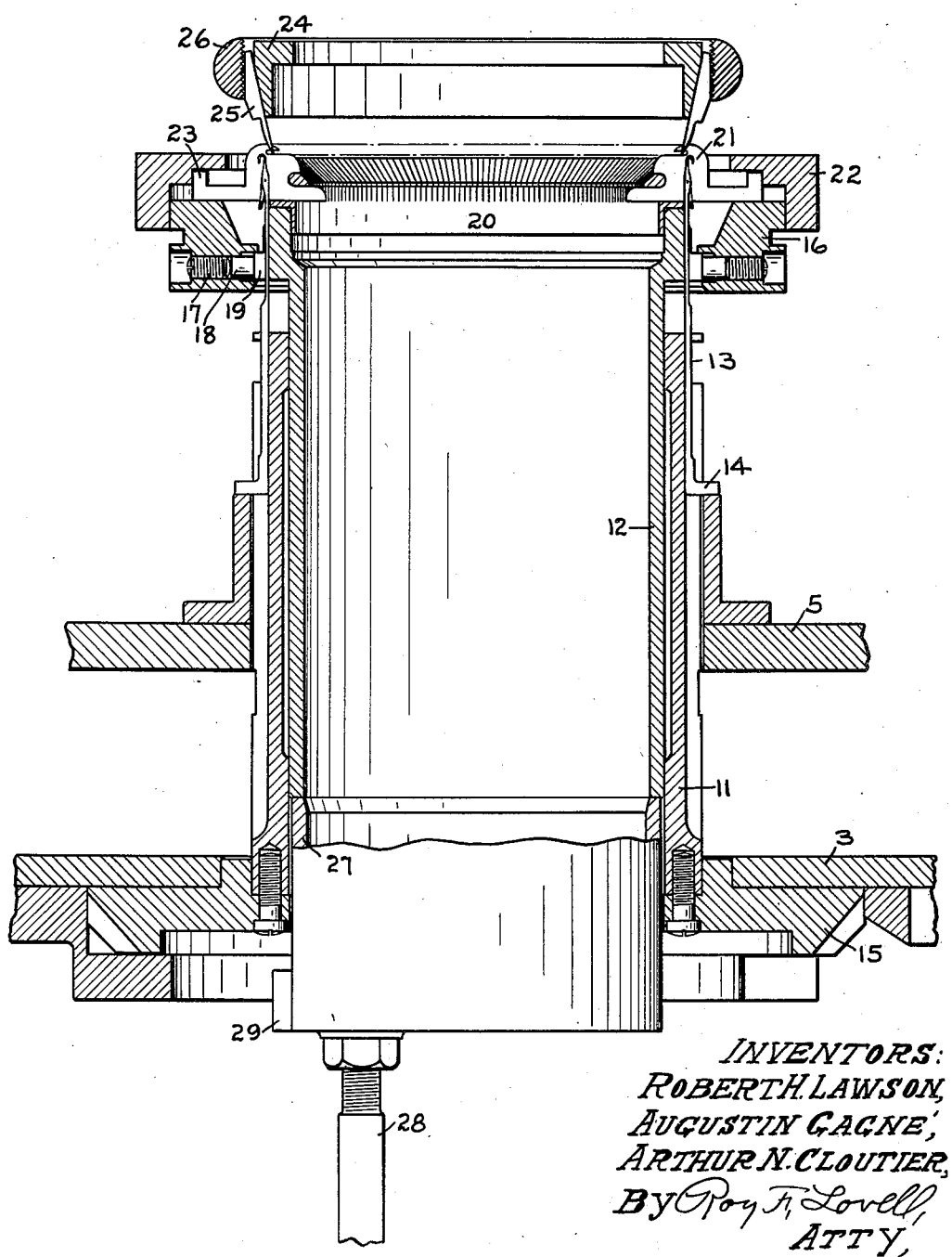

INVENTORS:
ROBERT H. LAWSON,
AUGUSTIN GAGNÉ,
ARTHUR N. CLOUTIER,
By Roy F. Lovell
ATT'Y.

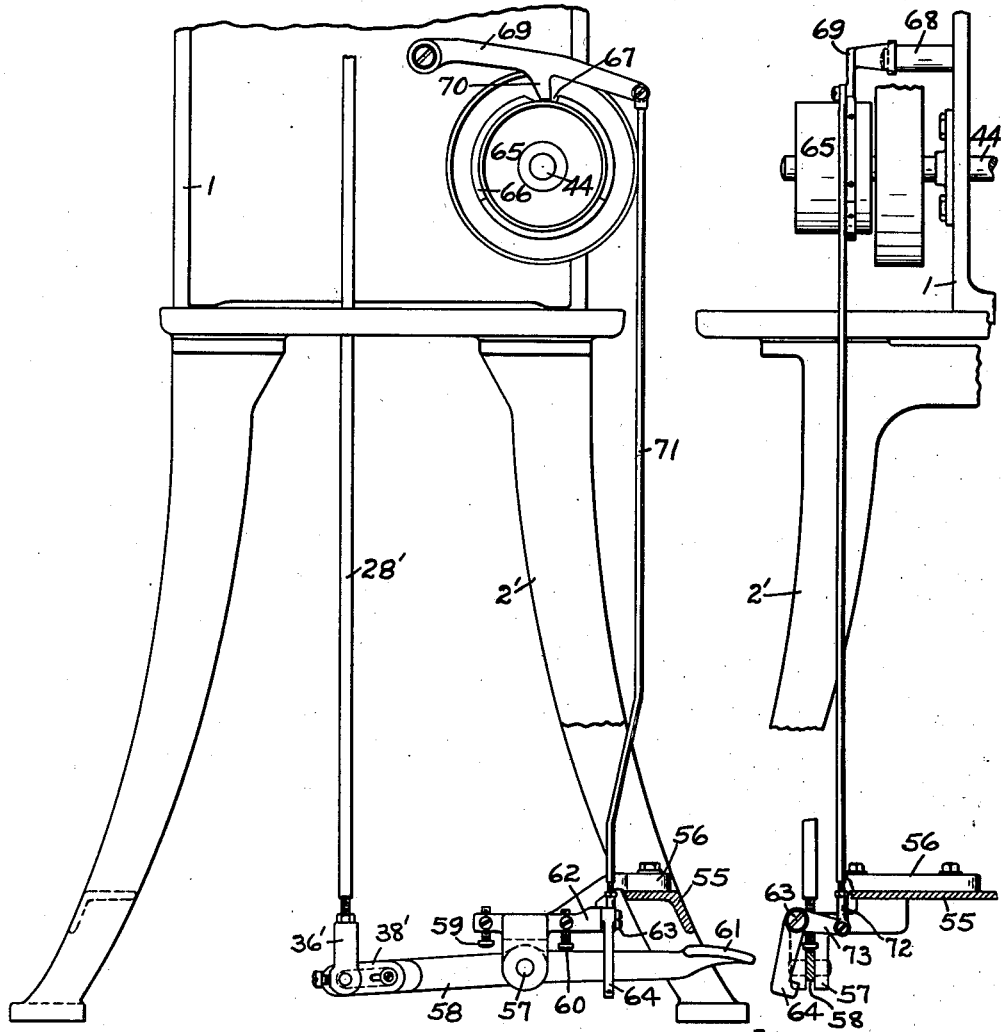

Aug. 3, 1937.   R. H. LAWSON ET AL   2,089,147
MACHINE FOR TRANSFERRING FABRIC
Filed Aug. 28, 1935   6 Sheets-Sheet 5

INVENTORS:
ROBERT H. LAWSON
AUGUSTIN GAGNÉ
ARTHUR N. CLOUTIER
By Roy F. Lovell
ATT'Y.

Patented Aug. 3, 1937

2,089,147

UNITED STATES PATENT OFFICE 2,089,147

MACHINE FOR TRANSFERRING FABRIC

Robert H. Lawson, Pawtucket, Augustin Gagné, Central Falls, and Arthur N. Cloutier, Lonsdale, R. I., assignors to Hemphill Company, Central Falls, R. I., a corporation of Massachusetts Application August 28, 1935, Serial No. 38,248
In Canada September 13, 1934

10 Claims. (Cl. 66—148)

This case deals with a method and mechanism for transferring fabric to the needles of a circular knitting machine prior to knitting other fabric thereon.

In the drawings:

Fig. 1 is a view in elevation showing the additional parts applied to a knitting machine for raising part of the cylinder, sinker head and sinkers prior to transfer;

Fig. 2 is a detail plan view of certain mechanism shown at the bottom of Fig. 1;

Fig. 3 is a front view showing the extension of the main cam shaft and cam drums thereon;

Fig. 4 is a sectional view showing the cylinder, sinker head and sinkers in raised position;

Fig. 6 is an elevation showing a modification of the mechanism shown in Fig. 1;

Fig. 7 shows in plan the operating pedal and mounting therefor;

Fig. 8 is a partial section showing the extension of the main cam shaft and the operating linkage associated therewith;

It is common practice when transferring fabric to the needles of a knitting machine such as a hosiery machine, to raise all the needles to a definite level above the sinkers and apply one of the conventional transfers having thereon a rib top or the like to said needles, then strip the fabric from the points of said transfer to the needles whereupon knitting of continuing fabric such as the ring top or a stocking leg may be commenced. When needles are raised to this high portion prior to transfer, they are not well spaced nor do they always lie in a true circle such as would be desirable for the correct application of the very fine points of a transfer member. Further, these needles are very springy when in this elevated position and it requires considerable patience for the operator to correctly apply the transfer in such a manner that loops held on the points will be accurately transferred to the correct individual needles. To overcome these difficulties the applicants have constructed a simple mechanism for elevating a portion of the needle cylinder, sinker head and sinkers to an elevation at least equal to and preferably slightly above the hooks of the leveled needles. A transfer member may then be applied to sinkers, each point being guided into the space between sinkers with very little effort on the part of the operator such as would be required if it were attempted to apply the points to the needles themselves. Points of a width sufficient to substantially fill the space between sinkers are preferably used. As the transfer points pass down between sinkers they can not fail to properly engage needles which lie between the sinkers. The sinkers themselves are firmly guided within the stitch ring and also within slots in the sinker head and are necessarily evenly spaced as well as rigidly held in position.

Figure 5:
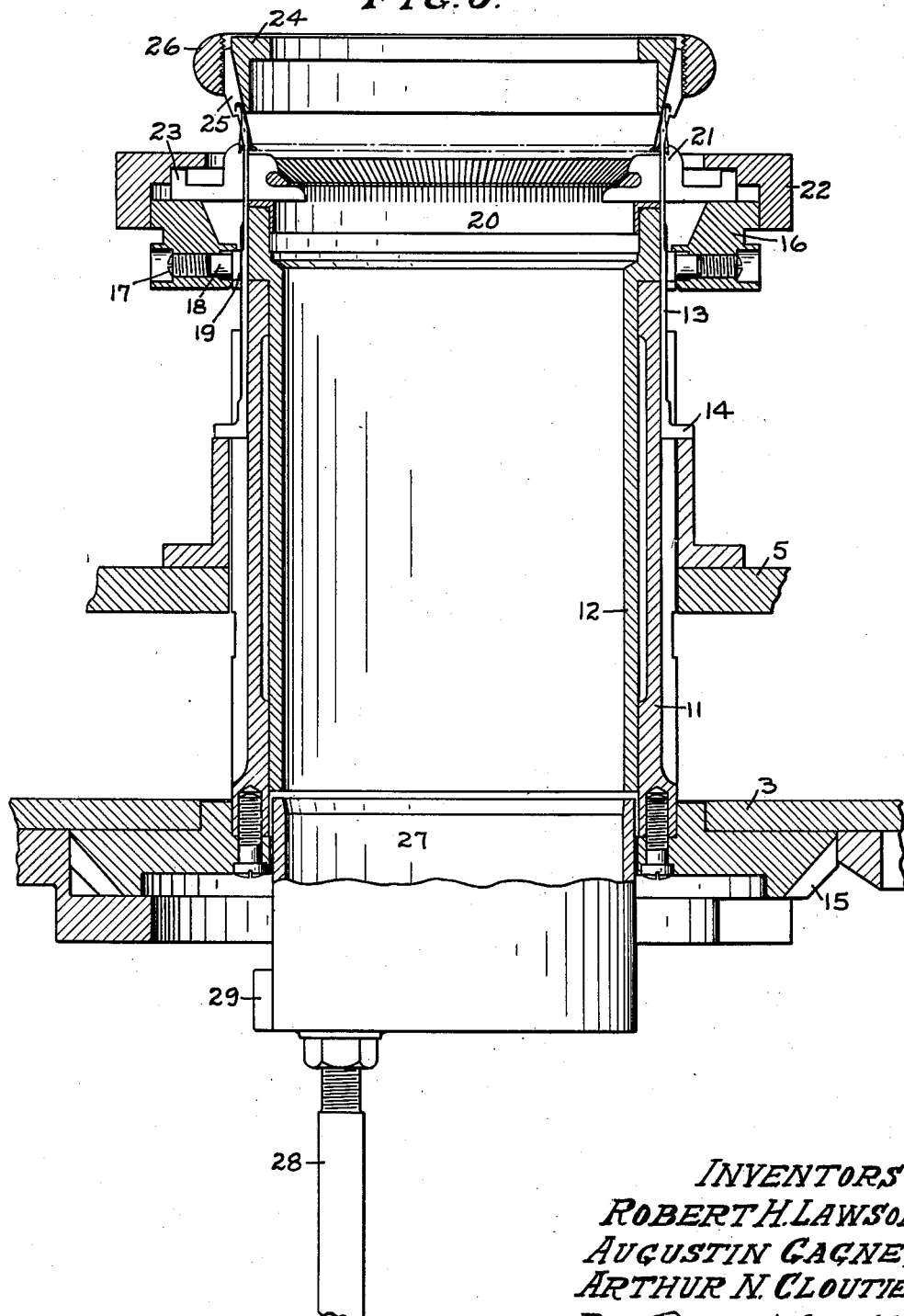
Fig. 5 is a view similar to Fig. 4 but showing the same parts in lower position.
Figure 12:
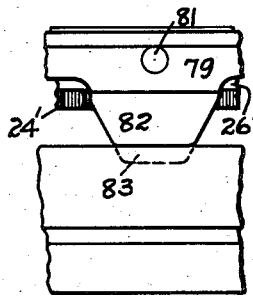
Fig. 12 shows in elevation one of the centering lugs depending from the transfer ring of Fig. 11.

Referring to Fig. 1, a circular knitting machine of ordinary construction is shown having a frame 1, supporting legs 2, a circular base 3, split needle cylinder generally indicated at 4 and a cam plate 5. A sinker head assembly is generally indicated at 6 with the usual sinker cap resting thereon. The usual latch ring 8 is pivoted to swing upwardly about point 9 at the top of a latch ring post 10. In Figs. 4 and 5 the two parts of the needle cylinder are indicated by numerals 11 and 12, the portion 12 telescoping within the outer portion 11 and having needle slots or tricks cut therein at the upper end which align with and form continuations of similar slots of the lower section 11. Needles 13 are shown within said slots and have butts 14 at their lower ends for engaging the usual needle cams. A ring gear 15 is shown attached to the lower part of cylinder 11 for rotating the same, but the invention is not necessarily limited to a machine of the rotating needle cylinder type. The needle cylinder may be stationary, the cams rotated relatively thereto.

A sinker head 16 is shown connected to the upper portion of inner cylinder 12 by the usual clamping means, i. e., set screws 17, brass plugs 18 and lugs 19. A stitch ring 20 has slots within which the inner ends of sinkers 21 are guided, the outer ends of said sinkers being guided in slots within sinker head 16. The usual sinker cap 22 carrying sinker cams (not shown) rests upon the sinker head and actuates sinkers by means of butts 23 at the outer ends of the same.

In Fig. 4, cylinder 12 and the sinker structure carried thereon has been shown elevated to a position in which the throats of sinkers are about even with the tops of needle hooks, said needles being leveled preparatory to transfer. This is about the position to which it is advisable to raise sinkers for a successful application of a transfer member, such being shown in Fig. 4 as the points of the same are entering between sinkers, it being understood that a rib or other stocking top would have previously been placed upon points of said transfer member. To simplify the showing, this stocking top has not been included in the drawing, the same being well-known to those skilled in the art. The transfer member shown in Figs. 4 and 5 is of very simple construction and merely comprises an inner ring 24, a plurality of points 25 and an outer clamping ring 26. It is understood that the number of points 25 corresponds to the number of needles in the machine to which fabric is to be transferred.

Cylinder 12 and the attached sinker and sinker cam assembly are normally held in the lower knitting position, Fig. 5, under the influence of gravity, but when a transfer is to be effected, are raised to the position of Fig. 4 by short cylindrical ring 27 loosely guided in cylinder 11 and actuated by a vertical rod 28 shown in Figs. 1, 4, and 5. A lug 29 is attached to the lower end of ring 27 and the upper end of rod 28 is adjustable in said lug by means of suitable adjusting nuts shown in Fig. 1, both above and below said lug. An auxiliary leg 30 projects down from the frame of said machine and carries fixed at its lower end a bracket 31 slotted to provide a bearing 32 for a lever 33 and also carrying a supporting bolt 34 adjustable in said bracket, and locked in position by means of a clamping nut 35. Rod 28 is adjustably threaded within a clevis 36 which is pivoted at 37 to the slotted end of lever 33 and plates 38, said plates being slotted at 39 and clamped to lever 33 by means of bolt 40. These plates constitute a means for adjusting pivot 37 along lever 33. This adjustment is provided so that the pivot point 37 may be properly aligned beneath lug 29. Such adjustment is necessary for different sizes of cylinder.

Lever 33 extends to the other side of its pivot 32 and is formed into a pedal 41. Safety mechanism is provided so that the operator may use pedal 41 to elevate the cylinder 12 and its attached sinker mechanism only at such times as the machine is in proper position for transfer. A cam lug 42 is attached to cam drum 43 which is rotatable with an extension to the main cam shaft 44. This drum has many other cams which operate other parts of the machine but since these have no bearing upon the instant invention, they have not been illustrated. Shaft 44 is guided at the outer end within a bearing 45, said bearing being located in a downwardly projecting portion of a bracket 46 attached to frame 1. A vertical post 47 is bolted to bracket 46 and has pivoted thereto a lever 48; a rod 49 is pivoted to the center portion of lever 48 and extends downwardly through a guideway, several of which are shown at 50 in bracket 46. The lower end of element 49 is beveled so that it will cooperate with cam 42 once during every revolution of main cam shaft 44 to swing lever 48 in an upward direction. A plate 51 is pivoted to swing about a bolt 52 extending from the pedal end of lever 33. A link 53 is pivoted at its lower end to plate 51 and is adjustably connected to pivot about the outer end of lever 48. In the position shown in Fig. 1, a stocking has been completed and cam shaft 44 has been rotated until cam 42 has elevated the outer end of lever 48 so that plate 51 has been swung in a clockwise direction. In this position the plate does not bear against the floor under the machine, or as shown, a metal element 54 attached thereto, and the operator may step on pedal 41 and thus raise the sinker assembly into the position of transfer, Fig. 4. At all times when cam 42 is not in engagement with element 49, plate 51 will act as a stop under pedal 41 to prevent accidental raising of sinkers, etc. As is clearly shown in Fig. 5, a slight clearance has been provided between the lower end of cylinder 12 and ring 27.

In Fig. 5 the cylinder 12 and sinker assembly have been shown lowered into their normal position, the transfer member being dropped down onto the needles and in engagement with said needles in a proper manner for perfect transfer.

A modification of the mechanism shown in Fig. 1 for reciprocating ring 27 will now be described with relation to Figs. 6–8. Legs 2' are attached to a frame 1, said legs being formed with strengthening braces 55 to one of which is fixed a bracket 56 extending at an angle to form a pivotal support 57 for a lever 58. This lever 58 has a slotted end and adjusting plates 38' to which is connected a clevis 36' adjustably attached to rod 28', similar to the corresponding elements shown in the modification of Fig. 1. Bracket 56 has two set screws 59 and 60 threaded therein which are adjustable and also capable of being locked in position, said set screws acting as stops for lever 58. Lever 58 extends to the front side of the machine in the form of a pedal 61. Bracket 56 extends at an angle to form projection 62 within which is threaded a screw 63 forming a pivot about which a latch 64 may swing. Latch 64 is adapted to hold lever 58 in a position wherein cylinder 12 and its attached sinker assembly can not be displaced accidentally.

Main cam shaft 44 extends outwardly of the frame and carries a cam drum 65. Along with other cams (not shown) a cam 66 is provided which is concentric in form except for the depression shown at 67, Fig. 6. A stud 68 projects outwardly from the machine frame and has pivoted thereto a lever 69, said lever having a cam follower 70 projecting therefrom at about its mid-portion and engaging cam 66, or as shown in Fig. 6, the depression 67 in that cam. At the outer end of lever 69 is pivoted a depending link 71 connected by means of an adjustable connecting piece 72 at its lower end to an arm 73 projecting laterally from latch 64. The depression 67 in cam 66 is arranged on cam drum 65 so that latch 64 will be released or swung out from under lever 58 only at a time when the machine is in proper position for transfer. Since cam shaft 44 rotates one complete turn for each stocking knitted, this depression 67 is arranged on cam drum 66 to engage follower 70 just after the completion of one stocking and prior to starting the cycle of knitting another.

Figure 13:
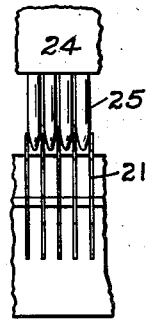
Fig. 13 is an enlarged detail showing how transfer points engage sinkers.
Figure 9:
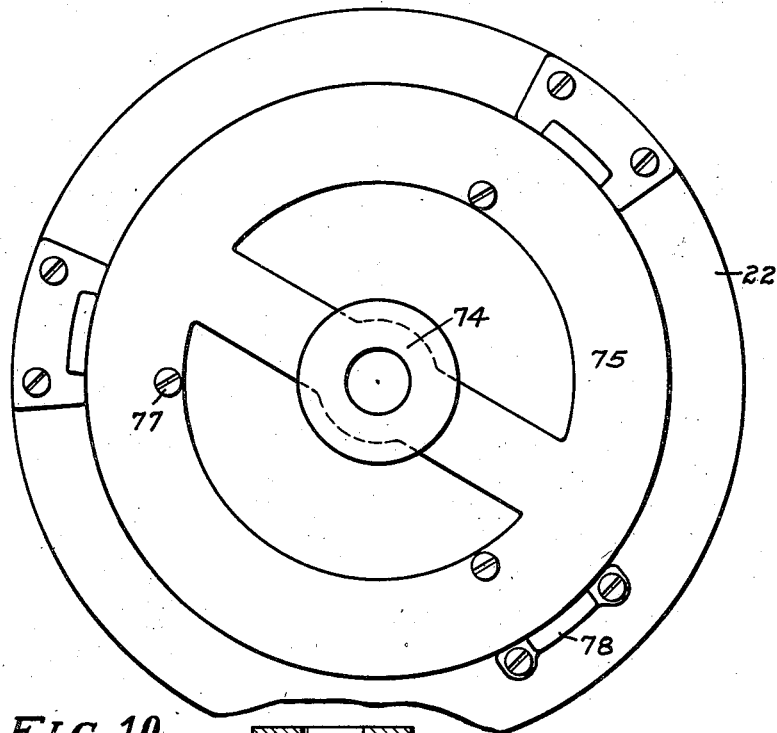
Fig. 9 is a plan view showing a transfer ring centered on the sinker cap.
Figure 10:
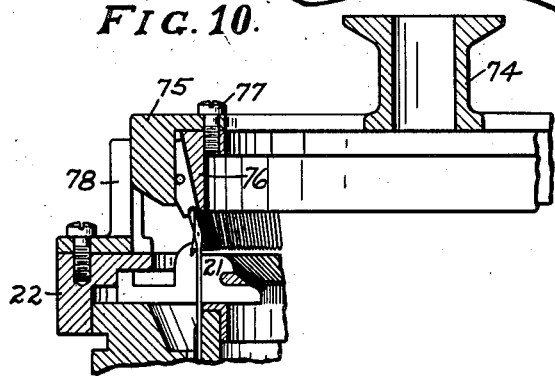
Fig. 10 is a sectional view, parts being broken away, showing the sinker head, sinkers, needles and the transfer ring applied thereto.
Figure 17:
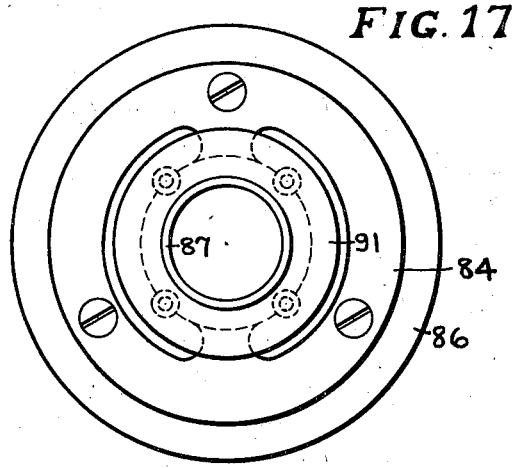
Fig. 17 is a plan view of this transfer.
Figures 18, 19:
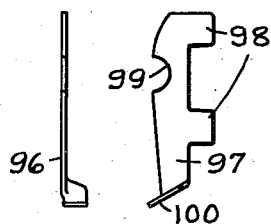
Figs. 18 and 19 show in detail one of the strippers used in this transfer.

Referring to Figs. 9–19, several transfer members adapted to cooperate with the needles and sinkers of a knitting machine for transferring fabric thereto have been shown. When applying any of the transfer members which have been illustrated to the raised sinkers, as shown in Fig. 4, the tapered points almost automatically enter between the evenly spaced sinkers as shown in Fig. 13. In certain cases it has been found desirable to center one of these transferring members in a positive way. In Figs. 9 and 10 a transfer has been shown which differs from that of Fig. 4 in that it has a handle or gripping piece 74 and clamping member 75, integral with said handle, attached to a body member 76 by means of screws 77. Clamping member 75 is finished off to form a flat outside surface of specific diameter.

A plurality of centering lugs 78, herein shown as three in number, are attached permanently to sinker cap 22. The lower edge of clamping member 75 is beveled off so that when applied to the sinkers as shown in Figs. 4 and 13, this transfer will automatically become centered as it enters between lugs 78.

Figure 11:
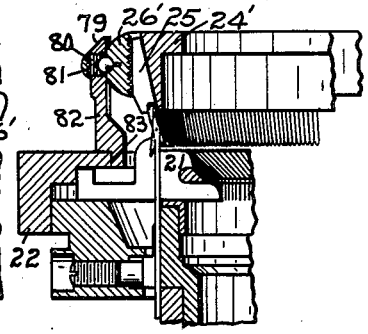
Fig. 11 is a view similar to Fig. 10 but showing a modified form of transfer ring.

In some cases it may not be desirable to permanently attach centering lugs to the sinker cap. A transfer member having centering lugs integral therewith has been shown in Figs. 11 and 12. Referring to Fig. 11, the usual points 25 are shown as clamped about the body member 24' by means of a clamping ring 26'. This clamping ring is grooved at its outer periphery to form a raceway. An outer ring 79 is drilled at intervals and short headless screws 80 threaded within their holes. These screws are formed at their inner ends for the reception of hardened steel balls which function as bearings within the groove in clamping ring 26'. When the screws 80 have been properly adjusted, they are secured by any suitable means such as by a drop of solder 81 to the outside end thereof. Centering lugs 82 project downwardly from ring 79 and have shouldered portions 83 at their lower ends which seat upon the sinker cap. These lugs serve to center the transfer member and also to maintain it at a proper height relative to the leveled needles. Since the inner portion of the transfer member rotates very freely on the ball bearing provided in the outer ring 79, the points will enter between sinkers even though the operator, holding ring 79 and applying the same to sinker cap 22, does not at first have these points in proper alignment.

The transfer illustrated in Figs. 14-19 is particularly compact and easy to apply for purposes of transfer; also, the transfer has strippers which operate effectively to strip fabric from the points and onto the needles. The transfer is formed by a two-part body member 84, 85, although said body may be formed as one piece. Points 25 are inserted in spaces in said body member and a clamping ring 86 secures them against displacement. The upper body member 84 is drilled axially for the reception of an inner sleeve 87 which is flared out at the bottom in the form of a flange 88. A groove 89 is machined vertically within element 84, and a pin 90 threaded into sleeve 87 and projecting into said groove, serves to prevent rotation of that sleeve when it is reciprocated vertically. A collar 91 is clamped to sleeve 87 by means of a set screw 92 and a plurality of springs 93, centered within holes in collar 91 and about pins 94 projecting upwardly from a flange 95 at the upper end of body member 84, serve to resiliently urge sleeve 87 and its flange 88 into the uppermost position shown in Fig. 14. A plurality of strippers, generally indicated at 96, are formed with shanks 97, lugs 98, a spring groove 99 and a stripping blade 100, Figs. 18, 19. These strippers are held in position about flange 88 by means of a coil spring 101 and lugs 98. The periphery of flange 88 is beveled to such an angle that tension of the spring 101 holds the stripping members outwardly against the inner edges of transfer points, the lower edge of flange 88 acting as a fulcrum on which the strippers 96 may rock.

Figure 15:
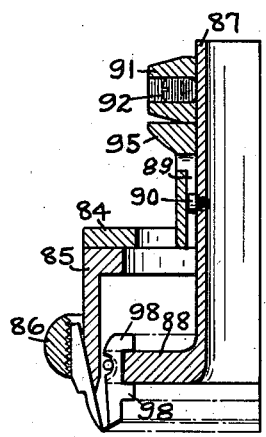
Fig. 15 is a sectional view corresponding to the sectional portion of Fig. 14, showing fabric strippers in lower position.
Figure 14:
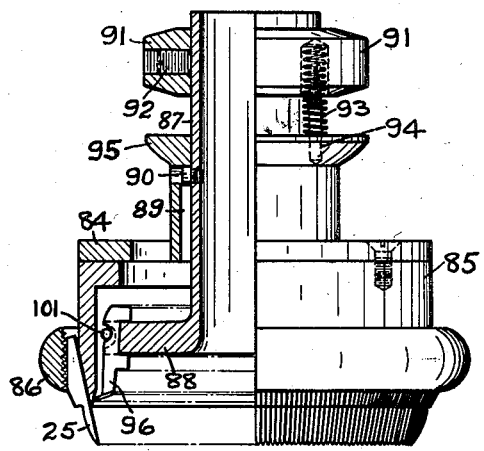
Fig. 14 is a view, partly in section and partly in elevation, of a modified form of transfer.
Figure 16:
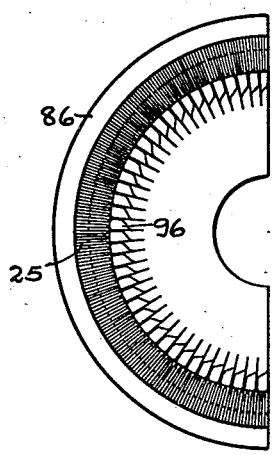
Fig. 16 is a view of the transfer of Figs. 14 and 15 seen from below.

In Fig. 15 sleeve 87 has been forced downwardly against the tension of springs 93 until the stripping members have reached the tips of the transfer points. Such a motion results in stripping the fabric from said points onto the cooperating needles. Since the stripping blades are resiliently held against the inner edges of the transfer points, each loop will be positively slipped downwardly off its point as the blade scrapes along the inner edge of said point. Flange 95 and collar 91 serve as a gripping handle which the operator uses to apply said transfer to sinkers and needles; and when so applied, it is only necessary to squeeze collar 91 down towards flange 95 to strip fabric from the transfer to the needles. This transfer is very useful when used with cylinders of small diameter wherein the operator cannot insert his hand to pull the fabric from points to needles. While the transfer members are useful when transferring directly on to the needles without raising sinkers to assist in the placement of said transfer, they are particularly useful when transferring as has been described in the first part of this application wherein it is desired to positively place a rib or other top on the needles of a stocking knitting machine in the shortest possible time, and without the skill of a very expert operator.

In operation the machine equipped with the novel mechanism herein disclosed would knit a stocking in the usual manner and at the end of such knitting operation, certain cams on the main shaft would throw the driving belt onto a loose pulley just as other cams function to throw the main cam block out away from the needle cylinder. This latter operation of throwing the cam block out may be performed by hand, but in any event, needles are all brought to the same level. Just as the said cam block is thrown out and the machine stopped, cams 42 or 66 would become operative to unlatch the operating pedal lever so that the movable portion of the needle cylinder and its attached sinker assembly may be instantly elevated.

The extent to which these parts may be raised is variable and while we have shown in Figs. 4 and 5 about the desired position of sinkers relative to leveled needles, the sinkers may be elevated to any position wherein they are high enough to guide points of a transfer member into spaces between themselves whereupon said points will accurately engage the proper needles. The operator then applies a suitable transfer member with the stocking top or other fabric to be transferred, to these raised sinkers. As before explained it is almost impossible for an operator to engage a transfer member improperly when using this system. Just as soon as the transfer points have been entered within spaces between sinkers the operator may lower the cylinder and sinker assemblies into their normal position thus lowering the transfer member until its points project well down upon the needles whereby loops may be stripped from said points down onto the needles. This stripping may be accomplished by hand or by any of the mechanical stripping devices such as we have shown in the Figs. 14–19. After such removal of fabric from points to needles a few excess courses are unraveled so that knitting may be resumed and the usual fabric knitted in continuance of this transferred fabric.

The invention has been disclosed in more or less specific terms and by showing specific embodiments, but this is not to be considered as limiting in any respects and we do not intend to be limited except by the scope of the appended claims.

We claim:

1. Mechanism for effecting the transfer of fabric to a knitting machine, said mechanism including means for elevating knitting instrumentalities above the needles to which the fabric is to be transferred thereby to center the fabric transferring elements in position to transfer the fabric to the needles, said means for elevating knitting instrumentalities having automatically controlled means functioning thereupon for rendering it inoperative at all times except when the machine is in position for transfer.

2. Mechanism for effecting the transfer of stitches to the needles of a knitting machine comprising a vertically reciprocable cylinder and a sinker head with sinkers attached to and vertically reciprocable with the said cylinder, and means for reciprocating the cylinder and sinkers, said means including manually controlled means operable only when fabric is to be transferred to the needles of a knitting machine.

3. Means for effecting the transfer of stitches to the needles of a knitting machine, said transfer means including a ring with transfer points thereon and means movable relatively thereto to remove the loops off the points and transfer them to the needles of a knitting machine, said relatively movable means including individually rockable members and resilient means for retaining the rockable members in position to engage the loops on the transfer points to ensure the movement of the stitches therefrom.

4. Means for effecting the transfer of stitches to the needles of a knitting machine, said transfer means including a ring with transfer points thereon and means movable relatively thereto to remove the loops off the points and transfer them to the needles of a knitting machine, said relatively movable means including individually movable members and resilient means for retaining the movable members in position to engage the loops on the transfer points to ensure the movement of the stitches therefrom.

5. The combination in a circular knitting machine of needles, a sinker head and sinkers operatively mounted therein, means for leveling said needles prior to transfer of fabric thereto, means for raising said sinker head and sinkers so that the tops of sinkers will be at about the level of hooks on said needles, said raising means comprising an operating pedal and locking means associated with said pedal to prevent accidental use of the same except when the machine is in proper position for transfer.

6. Mechanism as set forth in claim 5, wherein said locking means for said pedal is operated in proper timed relation by means of a cam on the main cam shaft.

7. A circular knitting machine having in combination a needle cylinder, needles reciprocable in tricks therein, a sinker head and sinkers therein, means for leveling needles prior to transfer of fabric thereto, and means for raising a part of said cylinder and the sinker head and sinkers to a position wherein teeth of a transfer ring applied to said machine will be centered between sinkers before engaging needles, said means including a foot pedal connected for lifting said part cylinder, sinker head and sinkers and safety means for preventing movement of said pedal except at that part of the knitting cycle wherein transfer is to be effected.

8. Mechanism as defined in claim 7, wherein said safety means comprises a plate pivoted to a part of said pedal and capable of preventing movement thereof when in one position, a rod for withdrawing said plate from a position wherein it prevents movement of the pedal, and cam controlled means functioning upon said rod and plate.

9. Mechanism as defined in claim 7, wherein said safety means includes a latch for maintaining said pedal in inoperative position, and cam controlled means for withdrawing said latch at a time specified.

10. In a circular knitting machine, a series of independently movable needles, a sinker head and sinkers operatively mounted therein, means for leveling needles prior to transfer of fabric thereto, means for raising said sinker head and sinkers so that the top of sinkers will be at a position to guide and center the points of a transfer instrument on to the needles, said raising means including means manually engageable by the machine operative and other means under timed control of the knitting machine for preventing movement of said manually controlled means except at such times as the machine is in position for transfer.

ROBERT H. LAWSON.
AUGUSTIN GAGNÉ.
ARTHUR N. CLOUTIER.